United States Patent
Hayakawa et al.

(10) Patent No.: US 6,689,839 B1
(45) Date of Patent: Feb. 10, 2004

(54) THERMOSET PAINT COMPOSITIONS

(75) Inventors: Takehi Hayakawa, Yokohama (JP);
Kishio Shibato, Yokohama (JP);
Yasuhiro Monma, Chigasaki (JP)

(73) Assignee: BASF Coatings AG, Munster (DE)

( * ) Notice: Subject to any disclaimer, the term of this patent is extended or adjusted under 35 U.S.C. 154(b) by 562 days.

(21) Appl. No.: 08/952,566
(22) PCT Filed: Apr. 19, 1996
(86) PCT No.: PCT/EP96/01633
§ 371 (c)(1),
(2), (4) Date: Sep. 11, 1998
(87) PCT Pub. No.: WO96/34064
PCT Pub. Date: Oct. 31, 1996

(30) Foreign Application Priority Data

Apr. 26, 1995 (JP) ............................................... 7-102743

(51) Int. Cl.$^7$ ............................. C08F 8/30; C08L 75/04; C09D 175/04
(52) U.S. Cl. ........................ 525/124; 525/125; 525/129; 525/131; 528/70
(58) Field of Search ................................. 525/124, 125, 525/129, 131; 528/70

(56) References Cited

U.S. PATENT DOCUMENTS

| | | | |
|---|---|---|---|
| 4,859,755 A | * 8/1989 | Schlipf et al. | 526/255 |
| 5,100,962 A | * 3/1992 | Sawada et al. | 525/125 |
| 5,147,934 A | * 9/1992 | Ito et al. | 525/124 |
| 5,169,915 A | * 12/1992 | Mohri et al. | 526/247 |
| 5,178,915 A | 1/1993 | Moyle et al. | 427/318 |
| 5,187,199 A | * 2/1993 | Sudo | 523/523 |
| 5,258,447 A | * 11/1993 | Koishi et al. | 524/544 |
| 5,523,164 A | * 6/1996 | Shibato et al. | 428/461 |

FOREIGN PATENT DOCUMENTS

| | | | |
|---|---|---|---|
| EP | 0 556 729 A1 | 8/1993 | |
| WO | WO94/09916 | 5/1994 | |

\* cited by examiner

*Primary Examiner*—Rabon Sergent

(57) ABSTRACT

Thermoset paint compositions with which paint films can be formed which have excellent acid resistance, abrasion resistance and adhesion, and with which the water repelling properties and staining resistance can be retained for a longer period of time than with the conventional fluorine resin based paint films, are obtained. Constitution: Thermoset paint film compositions which contain (a) from 20 to 80% by weight of fluorine containing copolymer, comprising fluoro-olefin and vinyl based monomer, of which the solubility parameter value is from 9.0 to 10.5 and the hydroxy group value is within the range from 60 to 150 mgKOH/g; (b) from 20–80% by weight of vinyl based (co)polymer, comprising vinyl based monomer which contains at least 10% by weight of monomer which can be repesented by formula (1), of which the solubility parameter is from 9.0 to 10.5 and the hydroxy group value is within the range from 60 to 150 mgKOH/g; (c) from 5 to 40% by weight of alkyl etherified melanine resin; and (d) from 2 to 40% by weight of blocked polyisocyanate compound, and with which the glass transition temperature of the paint film after hardening is at least 50° C. In formula (1), $R^1$ to $R^5$ each independantly represent H or methyl group, i is 0–2, j is 0 or 1, k is 0–3, m is 0–3 and n is 0–10.

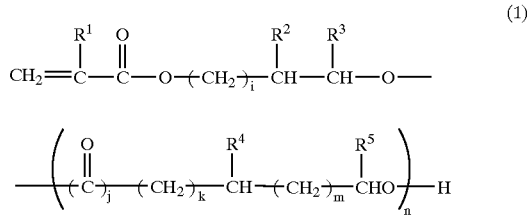

(1)

2 Claims, No Drawings

THERMOSET PAINT COMPOSITIONS

INDUSTRIAL FIELD OF APPLICATION

This invention concerns novel thermoset paint compositions. More precisely, the invention concerns thermoset paint compositions which are useful as top coat paints for automobile purposes which have excellent acid resistance, abrasion resistance, adhesion, staining resistance and water repelling properties.

PRIOR ART

In past years, the problem of paint film durability, especially rain spotting due to acid rain and abrasion due to rotating car-wash brushes and the sand and dust which is thrown up while driving, has arisen. Various means of providing improvements in respect of this problem have been suggested. For example, top coat paints which have excellent abrasion resistance and which contain alkoxymonomeric melamine resin, acrylic resin which has an open ring lactone chain, and fluorine containing resin, have been disclosed in Japanese Patent Kokai H3-288577. However, although a paint film which has excellent abrasion resistance is obtained with this technology, the bonds which are formed by the reaction of the alkoxy groups of the melamine resin and the polyol hydroxy groups are readily hydrolyzed by acids and so it is difficult to achieve good acid resisting performance. Furthermore, it is known that the alkoxy groups in a melamine resin form crosslinks quantitatively with hydroxy groups, and the effective crosslink density is dominated by the hydroxy group content. Consequently, in those cases where there are mol equivalents of hydroxy group and melamine resin alkoxy group, or where the alkoxy group is in excess, attachment to the base coat of a two-coat one-bake painting type paint film is poor and, moreover, recoat adhesion failure of a recoat painting paint film which has been obtained by means of the same painting process on a two-coat one-bake painting paint film can occur.

Paint compositions which have excellent abrasion resistance which include a fluorine containing copolymer, comprising hydroxy group containing long chain vinyl ether represented by the formula $CH_2=CHO(CH_2)_nOH$ (where n is 7 to 18) and fluoro-olefin, and a hardener which has functional groups which react with hydroxy groups, have been proposed in Japanese Patent Kokai H5-105840. Furthermore, catalyst free paint compositions which include copolymers obtained by reacting fluorine containing copolymers and polybasic acid anhydrides, and alkyl etherified melamine resin and isocyanate compound or blocked isocyanate compound, have been disclosed in Japanese Patent Kokai 61-200145.

However, although the abrasion resistance is certainly improved with the former technique, the acid resistance is unsatisfactory. Furthermore, although a paint film which has excellent acid resistance is obtained with the latter technique, the abrasion resistance is unsatisfactory. Moreover, although paint films which have excellent weather resistance and resistance to chemical attack are certainly obtained with these techniques because of the use of a fluorine resin, the glass transition temperature of the paint films obtained is not controlled and so, in those cases where the glass transition temperature is low, the molecular structure of the paint film is liable to be dominated by the external environment, the movement of atoms or molecules is facilitated, and this causes orientation of polar groups or non-polar groups at the paint film surface. Consequently, the water repelling properties and staining resistance which are the distinguishing features of a fluorine resin are not realized satisfactorily, and with such external physical and chemical changes it is difficult to maintain satisfactorily the features of the fluorine resin.

Problems to be Resolved by the Invention

The aim of this present invention is to provide thermoset paint compositions which resolve the problems of the conventional fluorine resin based paint films such as those described above, which can form paint films which have excellent acid resistance and abrasion resistance, and which also have excellent adhesion properties, staining resistance and water repelling properties.

Means of Resolving These Problems

As a result of thorough research carried out with a view to achieving the abovementioned aim, the inventors have discovered that the abovementioned aim can be achieved by means of blocked isocyanate compound, alkyl etherified melamine resin, (co)polymer which has terminal hydroxy groups at a position removed from the main chain and of which the solubility parameter and the hydroxy group value are within specified ranges, and fluorine containing copolymer of which the solubility parameter and the hydroxy group value are within specified ranges, and by providing material such that the glass transition temperature of the paint film after hardening is at least 50° C., and the invention is based upon this discovery.

That is to say, the present invention is a thermoset paint composition as indicated below.

(1) Thermoset paint composition, characterized in that it contains:
   (a) from 20 to 80% by weight of fluorine containing copolymer, being a copolymer of fluoro-olefin, hydroxy group containing vinyl based monomer and other vinyl based monomer, of which the solubility parameter is from 9.0 to 10.5 and the hydroxy group value is within the range from 60 to 150 mgKOH/g.
   (b) from 20–80% by weight of vinyl based (co)polymer, being a (co)polymer comprising vinyl based monomer which contains at least 10% by weight of monomer which can be represented by the general formula [1] indicated below, of which the solubility parameter is from 9.0 to 10.5 and the hydroxy group value is within the range from 60 to 150 mgKOH/g,
   (c) from 5 to 40% by weight of alkyl etherified melamine resin, and
   (d) from 2 to 40% by weight of blocked polyisocyanate compound, and in that the glass transition temperature of the paint film after hardening is at least 50° C.

General Formula [1]

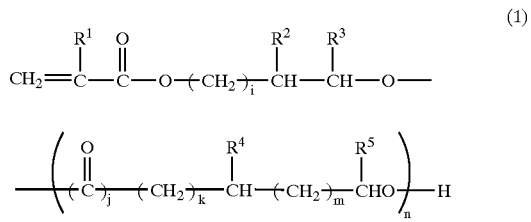

($R^1$ to $R^5$ each independently represent H or methyl group, i is 0–2, j is 0 or 1. k is 0–3, m is 0–3 and n is 0–10.)

(2) Thermoset paint composition, according to (1) above, wherein the fluorine containing copolymer (a) contains at least 10% by weight of hydroxy group containing vinyl based monomer which has at least four elements between the vinyl group and the hydroxy group, and in which the hydroxy group is located terminally.

A hardened paint film obtained by means of the thermoset paint compositions of this invention has a high glass transition temperature and, since a fluorine containing copolymer (a) is used as a main resin and a combination in which blocked polyisocyanate compound (d) which can form urethane bonds which have excellent resistance to chemical attack is used conjointly as well as the alkyl etherified melamine resin (c) for the hardener, the permeability of the paint film to hydrophilic substances such as acid rain is low, and it has a stable paint film structure which is not liable to bonding failure with acidic materials. Because of its excellent acid resistance and staining resistance, its water repelling properties can be retained over a longer time than with the conventional fluorine based paint films. Moreover, the crosslink structure which the soft segments which have hydroxy groups at the ends of flexible atomic groups which are located remote from the main chain of the vinyl based (co)polymer (b) can form, and the cohesive force of the urethane bonds which the blocked polyisocyanate compound (d) can form, impart elasticity such that the paint film recovers properly and is not deformed and/or ruptured by a load resulting from rubbing the paint film, and paint films which have excellent abrasion resistance can be formed. Moreover, the paint compositions of this invention also have excellent flex resistance and adhesion on recoating.

Tetrafluoroethylene, chlorotrifluoroethylene, 1,1-difluoroethylene, hexafluoropropylene, vinyl fluoride, vinylidene fluoride and derivatives such as carboxylic acid containing fluoro-olefins, for example, can be used as the fluoro-olefin copolymer component of the fluorine containing copolymer (a) which is used in this invention. These may be used individually, or two or more types may be used in combination.

The amount of fluoro-olefin included in the fluorine containing copolymer (a) can be varied arbitrarily, but it is, preferably from 20 to 60% by weight. If the amount exceeds 60% by weight then the solubility of the fluorine containing copolymer (a) in organic solvent is reduced, and if it is less than 20% by weight then the properties, such as the weather resistance and resistance to chemical attack, are adversely affected, and the water repelling properties and staining resistance which are characteristic of a fluorine based paint film are not realized.

The use of vinyl based monomers which have at least four elements between the vinyl group and the hydroxy group and in which the hydroxy group is located terminally are preferred for the hydroxy group containing vinyl based monomer copolymer component of the fluorine containing copolymer (a). Actual examples of such hydroxy group containing vinyl based monomers include hydroxy group containing vinyl ethers such as hydroxypropyl vinyl ether, hydroxybutyl vinyl ether and hydroxyhexyl vinyl ether; hydroxy group containing allyl ethers such as 2-allyloxy-1-ethanol, 3-allyloxy-1-propanol, 4-allyloxy-1-butanol, 5-allyloxy-1-pentanol, 6-allyloxy-1-hexanol, 7-allyloxy-1-heptanol, 8-allyloxy-1-octanol, the mono-allyl nether of polyethyleneglycol and the mono-allyl ether of polypropyleneglycol; mono-ethers of hydroxy group containing vinyl based monomers, such as 2-hydroxy (meth)acrylate or 2-hydroxypropyl (meth)acrylate, with polyether polyols such as polyethyleneglycol, polypropyleneglycol and polybutyleneglycol; monoesters or diesters of glycols such as polyethyleneglycol, polypropyleneglycol and 1,6-hexanediol with acid anhydride group containing vinyl based monomers, such as maleic acid anhydride and itaconic acid anhydride, and lactone modified vinyl based monomers wherein from 0 to 10 mol of lactone, such as ε-caprolactone, β-methyl-δ-valerolactone, χ-valerolactone, δ-valerolactone, α-caprolactone, ε-caprolactone, β-propiolactone or χ-butyrolactone for example, had been added to a hydroxy group containing vinyl monomer, such as 2-hydroxyethyl (meth)acrylate, 2-hydroxypropyl (meth)acrylate or hydroxybutyl (meth)acrylate for example.

When a vinyl monomer which has soft segments in which there are at least four elements between the vinyl group and the hydroxy group and in which the hydroxy group is located terminally is used for the hydroxy group containing vinyl based monomer which is a copolymer component of the fluorine containing resin (a), it is possible to impart elastic strength to the paint film obtained, and so it is possible to form paint films which are elastic and have excellent abrasion resistance.

The amount of hydroxy group containing vinyl based monomer included in the (a) component is preferably at least 10% by weight, and most desirably from 15 to 70% by weight. In those cases where the hydroxy group containing vinyl based monomer content is less than 10% by weight and in those cases where there are fewer than four elements between the vinyl group and the hydroxy group it is impossible to impart satisfactory elastic strength to the paint film obtained, and the abrasion resistance is unsatisfactory. Furthermore, in those cases where the hydroxy group is located other than terminally, the reactivity of the hydroxy group is reduced, and satisfactory adhesion is not obtained.

Examples of the other vinyl based monomer copolymer components of the fluorine based copolymer (a) include the $C_1$–$C_{18}$ alkyl or cycloalkyl esters of (meth)acrylic acid, such as methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, n-octyl (meth)acrylate, lauryl (meth)acrylate, tridecyl (meth)acrylate, stearyl (meth)acrylate and cyclohexyl (meth)acrylate; and also 2-hydroxyethyl (meth)acrylate, styrene, styrene derivatives, acrylonitrile, acrylamide, vinyltoluene, vinyl acetate, vinyl propionate, glycidyl (meth)acrylate, (meth)acrylic acid, ethyl vinyl ether, isobutyl vinyl ether, n-butyl vinyl ether, cyclohexyl vinyl ether and such like compounds. These may be used individually, or they may be used in combinations of two or more types.

The fluorine containing copolymer (a) component comprises fluoro-olefin, hydroxy group containing vinyl based monomer and other vinyl based monomer, as described above, but it may be modified by adding carboxylic acid to the resin using a triethylbenzylammonium chloride, for example, as catalyst, to add an acid anhydride, such as succinic anhydride, to the hydroxy groups in the molecule, as required.

The solubility parameter of the fluorine containing copolymer component (a) used in the invention is within the range from 9.0 to 10.5, and preferably within the range from 9.2 to 10.3. In those cases where the solubility parameter exceeds 10.5 the polarity of the fluorine based copolymer (a) is high and it becomes difficult to obtain a smooth paint film surface, and this is undesirable since the appearance of the paint film is adversely affected. Moreover, it is liable to cause a worsening of the water repelling properties and the staining resistance. Conversely, in those cases where the solubility parameter is less than 9.0, the compatibility with the (b) component, the (c) component and the (d) component is reduced, and this is undesirable.

Moreover, the solubility parameter can be measured in the following way. Thus, it can be obtained from the arithmetic average (SPH+SPW)/2 of the acetone/hexane mixed solubility parameter (SPH) observed when 1 gram of resin solid fraction is diluted 50 times with acetone and then n-hexane is added gradually to the dilute solution which is obtained until the resin solution becomes turbid and the acetone/water mixed liquid solubility parameter (SPW) observed when 1 gram resin solid fraction is diluted 50 times with acetone and then distilled water is added gradually to the dilute solution which is obtained until the resin solution becomes turbid. The solubility parameter indicates a resin of higher polarity as the value becomes larger and a resin of lower polarity as the value becomes lower.

Furthermore, the (a) component fluorine containing copolymer has a hydroxy group value within the range from 60 to 150 mgKOH/g, and preferably within the range from 70 to 140 mgKOH/g. In those cases where the hydroxy group value exceeds 150 mgKOH/g the solubility in solvent is decreased and, moreover, the appearance of the paint film is liable to be adversely affected, and this is undesirable. Conversely, in those cases where it is less than 60 mgKOH/g a satisfactory crosslink density for a hardened paint film cannot be obtained and the mechanical strength and solvent resistance of the paint film are unsatisfactory, and this is undesirable.

The (a) component fluorine containing copolymer can be obtained by means of a copolymerization reaction using a known method, such as solution polymerization, emulsion polymerization, suspension polymerization or bulk polymerization, in the presence of the usual radical initiators in an autoclave using a mixture of the aforementioned monomers.

Furthermore, commercial products can be used for the fluorine containing copolymer (a). Actual examples of such products include "Rumifron" [trade name, manufactured the Asahi Garasu Co.], "Fluonate" [trade name, manufactured by the Dainippon Inki Kagaku Kogyo Co.], "Sefralcoat" [trade name, manufactured by the Sentoraru Garasu Co.], "Zaflon" [trade name, manufactured by the Toa Gosei Kagaku Kogyo Co.] and "Zeffru" [trade name, manufactured by the Daikin Kogyo Co.].

Monomers which can be represented by general formula [1] which are (co)polymer components of the vinyl based (co)polymer (b) which is used in the invention include, for example, the mono-ethers of hydroxy group containing vinyl based monomers such as 2-hydroxyethyl (meth)acrylate or 2-hydroxypropyl (meth)acrylate with polyether polyols such as polyethyleneglycol, polypropyleneglycol and polybutylene glycol; monoesters or diesters of glycols such as polyethyleneglycol, polypropyleneglycol, 1,4-butanediol and 1,6-hexanediol with acid anhydride group containing vinyl based monomers such as maleic acid anhydride and itaconic acid anhydride; and lactone modified vinyl based monomers wherein from 0 to 10 mol of lactone, such as $\epsilon$-caprolactone, $\beta$-methyl-$\delta$-valerolactone, $\chi$-valerolactone, $\delta$-valerolactone, $\alpha$-caprolactone, $\epsilon$-caprolactone, $\beta$-propiolactone or $\chi$-butyrolactone for example, has been added to a hydroxy group containing vinyl monomer such as 2-hydroxyethyl (meth)acrylate, 2-hydroxypropyl (meth)acrylate or hydroxybutyl (meth)acrylate for example. These may be used individually, or two or more types can be used in combination.

Furthermore, vinyl monomers which do not contain fluorine can be used for the other vinyl based monomer which is a copolymer component of the vinyl based (co)polymer (b), and examples of these monomers include the $C_1$–$C_{18}$ alkyl or cycloalkyl esters of (meth)acrylic acid, such as methyl (meth)acrylate, ethyl (meth)acrylate, propyl (meth) acrylate, n-butyl (meth)acrylate, isobutyl (meth)acrylate, t-butyl (meth)acrylate, 2-ethylhexyl (meth)acrylate, n-octyl (meth)acrylate, lauryl (meth)acrylate, tridecyl (meth) acrylate, stearyl (meth)acrylate and cyclohexyl (meth) acrylate; and also 2-hydroxyethyl (meth)acrylate, styrene, styrene derivatives, acrylonitrile, acrylamide, vinyltoluene, vinyl acetate, vinyl propionate, glycidyl (meth)acrylate, (meth)acrylic acid and such like compounds. These may be used individually, or they may be used in combinations of two or more types.

The monomer represented by general formula [1] which is a (co)polymer component of the vinyl based (co)polymer (b) has a soft segment such that there are at least 4 elements between the vinyl group, and the hydroxy group and the hydroxy group is located terminally, and so the paint film obtained has elastic strength and can exhibit excellent abrasion resistance.

The amount of the aforementioned monomer represented by general formula [1] in the vinyl based (co)polymer (b) must be at least 10% by weight, but the inclusion of from 15 to 70% by weight is preferred. If the amount included is less than 10% by weight then it is impossible to provide the paint film with sufficient elastic strength, and not only is the abrasion resistance reduced but the flex resistance of the paint film obtained and the adhesion on recoating are adversely affected as well, and the aim of the invention is not realized.

The solubility parameter of the vinyl based (co)polymer (b) component used in the invention is within the range from 9.0 to 10.5, and preferably within the range from 9.2 to 10.3. In those cases where the solubility parameter exceeds 10.5 the polarity of the vinyl based (co)polymer (b) is high and it becomes difficult to obtain a smooth paint film surface, and this is undesirable since the appearance of the paint film is adversely affected. Conversely, in those cases where the solubility parameter is less than 9.0 the compatibility with the (a) component, the (c) component and the (d) component is reduced, and this is undesirable. The solubility parameter can be obtained in the same way as before.

Furthermore, the (b) component vinyl based (co)polymer has a hydroxy group value within the range from 60 to 150 mgKOH/g, and preferably within the range from 70 to 140 mgKOH/g. In those cases where the hydroxy group value exceeds 150 mgKOH/g the solubility in solvent is decreased and, moreover, the appearance of the paint film is liable to be adversely affected, and this is undesirable. Conversely, in those cases where it is less than 60 mgKOH/g a satisfactory crosslink density for a hardened paint film cannot be obtained and the mechanical strength and solvent resistance of the paint film are unsatisfactory, and this is undesirable.

The component (b) vinyl based (co)polymer can be obtained by carrying out a (co)polymerization reaction in the usual way, using the aforementioned monomer represented by general formula [1], or a vinyl based monomer mixture which contains the aforementioned monomer represented by general formula [1] and other vinyl monomer in the aforementioned proportions, in the presence of a known polymerization initiator, such as azobisisobutyronitrile, benzoyl peroxide, t-butylperoxy benzoate, t-butyl hydroperoxide, t-butylperoxy octoate, di-t-butyl peroxide or cumene hydroperoxide for example.

The alkyl etherified melamine resins normally used as hardeners in the paint field can be used for the alkyl etherified melamine resin (c) component which is used in this invention, but those obtained by methylolation of aminotriazine and alkyletherification with cyclohexanol or alkanols which have from 1 to 6 carbon atoms are preferred. Actual examples include butyl etherified melamine, methyl etherified melamine resin and mixed butyl/methyl etherified melamine resin. Actual examples of butyl etherified melamine resin include "Yuban 20SE" [trade name, manufactured by the Mitsui Toatsu Kagaku Co.] and "Superbekkamin L-116-70" [trade name, manufactured by the Dainippon Inki Kagaku Kogyo Co.]; and actual examples of methyl etherified melamine resin and mixed butyl/ethyl etherified melamine resin include "Nikalac MS-11" [trade name, manufactured by the Sanwa Chemical Co.] and "Saimel 235" [trade name, manufactured by the Mitsui Saitekku Co.].

The blocked products of the polyisocyanate compounds normally used as hardeners in the paint field can be used for the blocked polyisocyanate compound component (d) which is used in the invention and, for example, aromatic compounds, aliphatic compounds and non-yellowing type compounds can all be used. Actual examples of non-yellowing type blocked polyisocyanate compounds include those in which a polyisocyanate compound such as hexamethylene diisocyanate, trimethyl-hexamethylene diisocyanate, isophorone diisocyanate, hydrogenated diphenylmethane diisocyanate or hydrogenated xylylene diisocyanate or their adducts, biuret forms or isocyanurate forms has been blocked with the usual isocyanate blocking agents, including phenols, such as phenol, m-cresol, xylenol and thiophenol for example, alcohols, such as methanol, ethanol, butanol, 2-ethylhexanol and cyclohexanol for example, or active hydrogen containing compounds, such as caprolactam, methyl ethyl ketone oxime, ethyl acetoacetate and diethyl malonate for example. Actual examples of the blocked polyisocyanate compounds (d) include "Desmodure BL-3175" [trade name, manufactured by the Sumitomo Bayer Urethane Co.], "Coronate 2513" [trade name, manufactured by the Nippon Polyurethane Kogyo Co.], "Duranate 17B-60PX" [trade name, manufactured by the Asahi Kasei Kogyo Co.] and "Takenate XB-72-G16" [trade name, manufactured by the Takeda Yakuhin Kogyo Co.).

The compounding proportions of each resin component used in a thermoset paint composition of this invention must be in the range, on the basis of the total weight of the resin components (a) to (d), from 20 to 80% by weight, and preferably from 20 to 70% by weight, of component (a), from 20 to 80% by weight, and preferably from 20 to 70% by weight, of component (b), from 5 to 40% by weight, and preferably from 5 to 30% by weight, of component (c) and from 2 to 40% by weight, and preferably from 5 to 30% by weight, of component (d). If the (a) component content is less than 20% by weight then the properties of the fluorine containing copolymer (a) are not realized satisfactorily and the water repelling properties and the staining resistance of the paint film obtained are reduced, and if the amount included exceeds 80% by weight then the amount of hardener is insufficient and the formation of the crosslink structure in the paint film obtained is unsatisfactory, and the solvent resistance is reduced. Furthermore, if the (b) component content is less than 20% by weight then it is not possible to impart sufficient elastic strength to the paint film obtained and the abrasion resistance is unsatisfactory, or adhesion on recoating is reduced. On the other hand, if the amount exceeds 80% by weight then there is insufficient hardener and the formation of the crosslink structure of the paint film obtained is unsatisfactory, and the solvent resistance is reduced. Furthermore, if the (c) component content is less than 5% by weight the solvent resistance is inadequate, and if the amount exceeds 40% by weight then the acid resistance is reduced. Moreover, if the (d) component content is less than 2% by weight then the acid resistance is unsatisfactory, and if the amount exceeds 40% by weight then the paint film obtained is liable to yellowing.

Moreover, the hardened paint films obtained from thermoset paint compositions of this invention must have a glass transition temperature of at least 50° C., and preferably of from 55 to 90° C., in order to provide the prescribed excellent paint film performance. If the glass transition temperature is less than 50° C. then the water repelling properties and the staining resistance are reduced, and this is undesirable.

The paint compositions of this invention can be prepared by compounding the aforementioned components (a) to (d) in the proportions indicated above and mixing in the usual way with the usual means for the mixing of paints. Furthermore, polymers, such as acrylic based polymers, polyester based polymers, urethane based polymers, non-water dispersible type acrylic based polymers and crosslinked polymer particles for example; colorants, such as pigments and dyes; and additives, such as pigment dispersants, anti-run agents, leveling agents, hardening catalysts, gelling inhibitors, ultraviolet absorbers and radical scavengers which have been generally used in paints in the past, can be added, as required, in addition to the aforementioned essential components (a) to (d) within the range where the aim of the invention is not lost.

The paint compositions of this invention can be diluted with organic solvents. The usual paint solvents, such as aromatic solvents, ester based solvents, ketone based solvents and alcohol based solvents for example, can be used for the organic solvent, and no limitation is placed upon the solvent provided that it is a solvent in which the paint composition of this invention can be dissolved and dispersed.

The paint compositions of this present invention are preferably used as top coat paints, and in this case a base coat is painted after applying a primer paint and an undercoat paint, such as an electrodeposition type paint, to the surface of the item which is being painted, and then applying an intermediate paint as required, and then the top coat paint comprising a paint composition of this invention is painted over the top. In this case, the top coat paint may be applied after the base coat paint film had been hardened, but a two-coat one-bake painting system in which the top coat is applied over the base coat paint film in an unhardened or semi-hardened state and hardened at the same time as the base coat paint film is preferred. Furthermore, a one-coat one-bake painting system or an over-coating painting system, for example, can also be employed.

Methods of forming thermoset paint films of a paint composition of this invention include those in which a paint solution obtained by diluting a paint composition of this present invention with the aforementioned organic solvents is painted on by brushing, air spraying, dipping or rolling, for example, or by electrostatic painting, for example, and allowing a setting time of some 5 to 30 minutes and providing a satisfactorily smooth paint film, and then allowing the internal solvent to disperse to a certain extent and then hardening thermally for some 10 to 60 minutes at a temperature usually of from 100 to 180° C. so that a hardened paint film is obtained.

Materials which can be painted with a paint composition of this invention include metal surfaces, such as iron, steel, aluminum, zinc and alloys of these metals for example, and sheets which have been subjected to surface treatments, such as iron phosphate treatment, zinc phosphate treatment or chromate treatment for example, plastic surfaces, such as polyurethane, polypropylene and polycarbonate for example, and wood surfaces.

The thermoset paint compositions of this invention are such that the polarity of the main resins and the glass transition temperature of the hardened paint film are controlled, and so the water repelling properties and staining resistance which are the distinguishing features of a fluorine resin based paint film are retained over a prolonged period of time. Furthermore, the hardened paint film is highly abrasion resistant and acid resistant because it has a soft segment structure and urethane bonds which have excellent resistance to chemical attack. Moreover, paint films of which the adhesion properties on recoating are excellent as well are obtained.

ILLUSTRATIVE EXAMPLES

The invention is described in more detail below by means of examples of manufacture, illustrative examples and comparative examples, but the invention is not limited in any way by these examples.

Example of Manufacture 1 Manufacture of a Base Coat Paint

Styrene (150 grams), 280 grams of methyl methacrylate, 400 grams of butyl methacrylate, 150 grams of 2-hydroxyethyl methacrylate and 20 grams of acrylic acid were copolymerized in xylene using azobisisobutyronitrile as polymerization initiator, and an acrylic resin solution of residue on heating 50 wt % was obtained. The weight average molecular weight by gel permeation chromatography (calculated as polystyrene) was 32000.

A solvent type base coat paint of which the formulation is indicated below was prepared using this acrylic resin solution.

| Acrylic resin solution | | 140 parts by weight |
|---|---|---|
| Amino resin solution | 1) | 50 parts by weight |
| CAB resin solution | 2) | 25 parts by weight |
| Aluminum paste | 3) | 15 parts by weight |
| Ultraviolet absorber solution | 4) | 10 parts by weight |
| Photostabilizer solution | 5) | 5 parts by weight |
| Levelling agent solution | 6) | 3 parts by weight |

NOTES)
1) A butyl etherified melamine resin solution, residue on heating 60 wt %, trade name "Yuban 20SE", manufactured by the Mitsui Toatsu Kagaku Co.
2) A 20 wt % butyl acetate solution of (cellulose acetate butyrate resin) trade name "CAB381-2", manufactured by the Eastmann Co.
3) A 65 wt % aluminum paste, trade name "SAP-561PS", manufactured by the Showa Aluminum Powder Co.
4) A 10 wt % xylene solution of "Tinuvin 900" (trade name) manufactured by the Ciba Geigy Co.
5) A 10 wt % xylene solution of "Sanol LS292" (trade name) manufactured by the Mitsui Co.
6) A 20 wt % xylene solution of 37 Modaflow" (trade name) manufactured by the Monsanto Co.

Next, this base coat paint was diluted and adjusted using a toluene/vinyl acetate/isobutyl alcohol mixture (ratio by weight 5/3/2) so that the viscosity with a No.4 Ford cup was 13 seconds (20° C.).

Example of Manufacture 2 Manufacture of Fluorine Containing Copolymers (a) FO-1 to FO-4 t-Butanol (200 ml), 17.6 grams of 4-hydroxybutyl vinyl ether, 9.3 grams of cyclohexyl vinyl ether, 33.1 grams of isobutyl vinyl ether, 1.0 gram of potassium carbonate and 0.1 gram of azobisisobutyronitrile were introduced into a stainless steel autoclave which was equipped with a stirrer, and the dissolved air was removed by solidification and degassing with liquid nitrogen, and then 40.0 grams of chlorotrifluoroethylene were introduced into the autoclave and the temperature was raised gradually. The temperature was then maintained at 65° C. and polymerization was carried out for 10 hours, after which the unreacted chlorotrifluoroethylene was removed and the autoclave was opened. Succinic acid anhydride (0.9 grams) and 0.03 grams of triethylhexylammonium chloride were then added and reacted for 3 hours at 100° C. Next, the resin solution obtained was dropped into water and washed and dried, after which a xylene/n-butanol mixture (ratio by weight 1/1) was added to form a solution such that the resin concentration was 60 wt %, and the fluorine containing copolymer FO-1 was obtained in this way. The solubility parameter of the fluorine containing copolymer FO-1 obtained was 9.2, and its hydroxy group value was 80 mgKOH/g. Furthermore, the results on analysis were such that the copolymer composition corresponded more or less with the monomer composition.

Furthermore, the monomers indicated in Table 1 were polymerized in the proportions shown in the table using the same method of polymerization as used for the fluorine containing copolymer FO-1, and the fluorine containing copolymers FO-2 to FO-4 which had the properties shown in Table 1 respectively were obtained.

TABLE 1

| | FO-1 | FO-2 | FO-3 | FO-4 |
|---|---|---|---|---|
| Components introduced (parts by weight) | | | | |
| Monomer Composition | | | | |
| Chlorotrifluoroethylene | 40.0 | 55.0 | 55.0 | 50.0 |
| Hydroxybutyl vinyl ether | 17.6 | 21.7 | 28.0 | 37.3 |
| Cyclohexyl vinyl ether | 9.3 | 20.2 | 1.6 | — |
| Isobutyl vinyl ether | 33.1 | 3.1 | — | — |
| Vinyl propionate | — | — | 15.4 | — |
| Vinyl acetate | — | — | — | 12.7 |
| Total | 100 | 100 | 100 | 100 |
| Succinic anhydride for modification reaction purposes | 0.9 | 0.9 | 2.6 | 3.6 |
| Properties: | | | | |
| Solubility Parameter | 9.2 | 9.8 | 10.2 | 10.7 |
| Hydroxy Group Value (mgKOH/g) | 80 | 100 | 120 | 160 |
| Acid Value (mgKOH/g) | 5 | 5 | 15 | 20 |
| Weight Average Molecular weight | 17900 | 18000 | 16900 | 18300 |
| Residue on Beating (wt %) | 60 | 60 | 60 | 60 |

Example of Manufacture 3 Manufacture of Vinyl Based Copolymers (b) AC-1 to AC-5

Xylene (30 parts by weight) and 25 parts by weight of n-butanol were introduced into a four-necked flask which had been fitted with a thermometer, a stirrer, a reflux condenser and a dropping funnel and the temperature was raised to 115° C. with stirring. A mixture of 100 parts by weight of the monomer and 2.0 parts by weight of the polymerization initiator shown in Table 2 was then added dropwise over a period of 2 hours from the dropping funnel. After the drip feed had been completed, the mixture was stirred for a further 1 hour while maintaining the temperature at 115° C. Subsequently, 0.2 parts by weight of supplementary polymerization initiator were added and the stirring at 115° C. was continued for a further 1 hour, and the reaction was completed. The vinyl based copolymer AC-1 obtained had an involatile content of 60 wt % and was in the form of a uniform transparent solution.

Furthermore, the monomers indicated in Table 2 were polymerized in the proportions shown in the table using the same method of polymerization as for the vinyl based polymer AC-1, and the vinyl based copolymers AC-2 to AC-5 which had the properties shown in Table 2 respectively were obtained.

TABLE 2

|  | AC-1 | AC-2 | AC-3 | AC-4 | AC-5 |
|---|---|---|---|---|---|
| Drip Feed Component (parts by weight) | | | | | |
| Monomer Composition: | | | | | |
| Praksel FM-1 *1 | 60.9 | 52.2 | 34.8 | 43.5 | 69.9 |
| Acrylic acid | 1.3 | 1.3 | 1.3 | 1.3 | 2.6 |
| 2-Ethylhexyl methacrylate | 7.0 | 26.0 | 35.0 | 20.0 | — |
| Cyclohexyl methacrylate | 20.4 | 10.0 | 5.0 | 25.2 | 17.5 |
| n-Butyl acrylate | 10.4 | — | — | 10.0 | — |
| t-Butyl acrylate | — | 10.5 | 23.9 | — | — |
| Styrene | — | — | — | — | 10.0 |
| Total | 100 | 100 | 100 | 100 | 100 |
| Polymerization Initiator | | | | | |
| tBPOEH *2 | 2.0 | 2.0 | 1.7 | 1.7 | 2.0 |
| Supplementary Polymerization Initiator | | | | | |
| tBPOEH *2 | 0.2 | 0.2 | 0.2 | 0.2 | 0.2 |
| Properties | | | | | |
| Solubility Parameter | 10.3 | 9.8 | 9.3 | 9.8 | 10.7 |
| Hydroxy Group Value (mgKOH/g) | 140 | 120 | 80 | 100 | 160 |
| Acid Value (mgKOH/g)) | 10 | 10 | 10 | 10 | 15 |
| Glass Transition Temperature (° C.) | 1 | 9 | 19 | 5 | 16 |
| Weight Average Molecular Weight | 13400 | 15200 | 13900 | 16600 | 14700 |
| Residue on seating (wt %) | 60 | 60 | 60 | 60 | 60 |

*1 "Prakcel FM-1" (Trade name, a monomer represented by the aforementioned general formula [1], where $R^1$ is a methyl group, $R^2$ is H, $R^3$ is H, $R^4$ is H, $R^5$ is H, i = 0, j = 1, k = 3, m = 0 and n = 1, in which 1 mol of ε-caprolactam had been added to 2-hydroxyethyl methacrylate, manufactured by the Daiseru Kagaku Kogyo Co.]
*2 t-Butylperoxy 2-ethylbenzoate

Illustrative Examples 1–6 and Comparative Examples 1–3

Using the fluorine containing copolymers (a) and the vinyl based copolymers (b) obtained in Examples of Manufacture 2 and 3, mixtures were prepared in the compounding proportions shown in Tables 3 to 5 and the solutions obtained were adjusted to a No.4 Ford Cup viscosity of 25 seconds (20° C.) using a Sorbesso #150/n-butanol mixture (ratio by weight 9/1) to provide clear coat paints.

Next, "Aqua No.4200" [trade name, cationic electrodeposition paint, manufactured by the Nippon Yushi Co.] was electrodeposition painted to provide a hardened film thickness of 20 μm on a zinc phosphate treated steel sheet and, after baking for 20 minutes at 175° C., "Baiepiko No.100" [trade name, intermediate coat paint manufactured by the Nippon Yushi Co.] was air spray painted so as to provide a hardened film thickness of 40 μm, and this was baked for 20 minutes at 140° C. The base coat paint of Example of Manufacture 1 was painted on this paint film by air spraying in two stages with an interval of 1 minute 30 seconds so as to provide a hardened film thickness of 15 μm, after which the paint was set for 3 minutes at room temperature, and then the clear coat paints shown in Tables 3 to 5 were painted on by air spray painting so as to provide a hardened film thickness of 40 μm and specimens were obtained by baking for 20 minutes at 140° C.

Paint film performance was evaluated using the specimens obtained. Moreover, for the abrasion resistance test, specimens were obtained by painting "Hyepiko No.100 Black" [trade name, intermediate coat paint manufactured by the Nippon Yushi Co.] and baking and then direct air spray painting the clear coat paints shown in Tables 3–5 and baking at 140° C. for 20 minutes. The test results are shown in Table 6.

TABLE 3

|  |  |  | (Parts by weight) Illustrative Example | | |
|---|---|---|---|---|---|
|  |  |  | 1 | 2 | 3 |
| (a) Component | FO-1 | | 66.7 | — | — |
|  | FO-2 | | — | 83.3 | — |
|  | FO-3 | | — | — | 50.0 |
|  | FO-4 | | — | — | — |
| (b) Component | AC-1 | | 50.0 | — | — |
|  | AC-2 | | — | 33.3 | — |
|  | AC-3 | | — | — | 50.0 |
|  | AC-4 | | — | — | — |
|  | AC-5 | | — | — | — |
| (c) Component | Yuban 20SE | *1 | 33.3 | 16.7 | 50.0 |
|  | Saimel 235 | *2 | — | — | — |
| (d) Component | Desmodur BL-3175 | *3 | 13.3 | — | — |
|  | Desmodure TPLS-2759 | *4 | — | 26.7 | — |
|  | Coronate 2513 | *5 | — | — | 12.5 |
| Hardening Catalyst Additives | DBTDL Solution | *6 | 1.0 | — | — |
|  | PTSA Solution | *7 | — | — | — |
|  | Ultraviolet Absorber Solution | *8 | 10.0 | 10.0 | 10.0 |
|  | Photostabilizer Solution | *9 | 10.0 | 10.0 | 10.0 |
|  | Levelling Agent Solution | *10 | 0.1 | 0.1 | 0.1 |

TABLE 4

|  |  |  | (Parts by weight) Illustrative Example | | |
|---|---|---|---|---|---|
|  |  |  | 4 | 5 | 6 |
| (a) Component | FO-1 | | — | — | — |
|  | FO-2 | | 33.3 | 100.0 | 50.0 |
|  | FO-3 | | — | — | — |
|  | FO-4 | | — | — | — |
| (b) Component | AC-1 | | — | — | — |
|  | AC-2 | | 100.0 | 33.3 | — |
|  | AC-3 | | — | — | — |
|  | AC-4 | | — | — | 50.0 |
|  | AC-5 | | — | — | — |
| (c) Component | Yuban 20SE | *1 | — | ·8.3 | 16.7 |
|  | Saimel 235 | *2 | 15.0 | — | — |
| (d) Component | Desmodure BL-3175 | *3 | — | 20.0 | 40.0 |
|  | Desmodure TPLS-2759 | *4 | 6.7 | — | — |
|  | Coronate 2513 | *5 | — | — | — |
| Hardening Catalyst Additives | DBTDL Solution | *6 | — | 1.0 | 1.0 |
|  | PTSA Solution | *7 | 2.5 | — | — |
|  | Ultraviolet Absorber Solution | *8 | 10.0 | 10.0 | 10.0 |
|  | Photostabilizer Solution | *9 | 10.0 | 10.0 | 10.0 |
|  | Levelling Agent Solution | *10 | 0.1 | 0.1 | 0.1 |

TABLE 5

| | | | (Parts by weight) Comparative Example | | |
|---|---|---|---|---|---|
| | | | 1 | 2 | 3 |
| (a) Component | FO-1 | | — | — | 116.7 |
| | FO-2 | | — | 116.7 | — |
| | FO-3 | | — | — | — |
| | FO-4 | | 33.3 | — | — |
| (b) Component | AC-1 | | — | — | — |
| | AC-2 | | — | — | — |
| | AC-3 | | — | — | — |
| | AC-4 | | — | — | — |
| | AC-5 | | 100.0 | — | — |
| (c) Component | Yuban 20SE | *1 | — | 50.0 | — |
| | Saimel 235 | *2 | 20.0 | — | — |
| (d) Component | Desmodure BL-3175 | *3 | — | — | 40.0 |
| | Desmodure TPLS-2759 | *4 | — | — | — |
| | Coronate 2513 | *5 | — | — | — |
| Hardening Catalyst Additives | DBTDL Solution | *6 | — | — | 1.0 |
| | PTSA Solution | *7 | 2.5 | — | — |
| | Ultraviolet Absorber Solution | *8 | 10.0 | 10.0 | 10.0 |
| | Photostabilizer Solution | *9 | 10.0 | 10.0 | 10.0 |
| | Levelling Agent Solution | *10 | 0.1 | 0.1 | 0.1 |

Notes for Tables 3 to 5
*1 "Yuban 20SE" [trade name, butyl etherified melamine resin solution, residue on heating 100 wt %, manufactured by the Mitsui Toatsu Kagaku Co.]
*2 "Saimel 235" [trade name, mixed butyl/methyl etherified melamine resin, residue on heating 100 wt %, manufactured by the Mitsui Saitekku Co.]
*3 "Desmodure BL-3175" [trade name, non-yellowing type blocked isocyanate compound solution, residue on heating 75 wt %, manufactured by the Sumitomo Bayer Urethane Co.]
*4 "Desmodure TPLS-2759" [trade name, blocked isocyanate compound solution, residue on heating 75 wt %, manufactured by the Sumitomo Bayer Urethane Co.]
*5 "Coronate 2513" [trade name, non-yellowing type blocked isocyanate compound solution, residue on heating 80 wt %, manufactured by the Nippon Polyurethane Kogyo Co.]
*6 A 50 wt % xylene solution of dibutyltin dilaurate
*7 A 20 wt % isopropanol solution of p-toluenesulfonic acid
*8 A 10 wt % xylene solution of "Tinuvin 960" (trade name) manufactured by the Ciba Geigy Co.
*9 A 10 wt % xylene solution of "Sanol LS292" (trade name) manufactured by the Mitsui Co.
*10 A 20 wt % xylene solution of "Modaflow" (trade name) manufactured by the Monsanto Co.

TABLE 6

| | Illustrative Example | | | | | | Comparative Example | | |
|---|---|---|---|---|---|---|---|---|---|
| | 1 | 2 | 3 | 4 | 5 | 6 | 1 | 2 | 3 |
| Glass Transition. Temperature (° C.) *1 | 65 | 80 | 75 | 65 | 80 | 70 | 75 | 85 | 45 |
| Paint Film Appearance *2 | ○ | ○ | ○ | ○ | ○ | ○ | X | ○ | ○ |
| Acid Resistance *3 | ○ | ○ | ○ | ○ | ○ | ○ | X | X | ○ |
| Abrasion Resistance *4 | ○ | ○ | ○ | ○ | ○ | ○ | Impossible to decide | X | X |
| Recoat Adhesion *5 | ○ | ○ | ○ | ○ | ○ | ○ | ○ | X | X |
| Staining Resistance *6 | ○ | ○ | ○ | ○ | ○ | ○ | Δ | ○ | X |
| Water Repelling Properties *7 | ○ | ○ | ○ | ○ | ○ | ○ | Δ | ○ | X |
| Gasoline Resistance *8 | ○ | ○ | ○ | ○ | ○ | ○ | Impossible to decide | ○ | X |
| Weather Resistance *9 | ○ | ○ | ○ | ○ | ○ | ○ | Impossible to decide | ○ | ○ |

Notes for Table 6
*1 Glass Transition Temperature
A free film of the clear coat paint was prepared and the dynamic visco-elasticity was measured using a "Reovibron DDV-II-EA"

[manufactured by the Orientekku Co.) and the glass transition temperature was obtained from the temperature at which the complex elastic modulus exhibited its maximum value.
*2 Paint Film Appearance
The gloss, smoothness and sense of depth of the finished paint film were observed visually.
○: The paint film appearance was glossy, smooth and deep.
Δ: The paint film lacked gloss and was rough.
X: The paint film had no gloss and was rough. Moreover it had no sense of depth.
*3 Acid Resistance
A 40 wt % aqueous sulfuric acid solution (0.2 ml) was placed as a spot on the specimen and washed off after heating to 60° C. for 15 minutes, and the extent of marking was observed visually.
○: No abnormality
X: Water droplet mark.
*4 Abrasion Resistance
Muddy water (JIS Z-8901-84 Class 8 a mixture of dust/water/neutral detergent = 10/99/1 by weight) was spread with a brush onto the specimen and then it was washed in running water by rotating the brush wheels in an automatic car-wash machine at 150 rpm for 10 seconds. This operation was repeated four times and then the extent of abrasion of the specimen surface was measured by measuring the L* value with a color difference meter [CR-331, manufactured by the Minolta Camera Co.]. The ΔL* value was calculated using the following equation, and the abrasion resistance was evaluated on the basis of this value.
ΔL* = L* value after testing − L* value before testing
○: ΔL* value less than 6
Δ: ΔL* value at least 6 but less than 10
X: ΔL* at least 10
*5 Recoat Adhesion
After painting twice with a two-coat one-bake system with the base coat paint and the clear coat paint using the method described earlier (baking conditions: 2 × 140° C. × 30 minutes), a 2 mm scale was prepared, in accordance with JIS K-5400 (1990), 8.5 Adhesion Testing, and the state of peeling of the paint film was observed visually.
○: No peeling of the paint film
X: Peeling of the paint film
*6 Staining Resistance
The specimen was exposed for 3 months on the roof of a building facing the Capital Freeway where there was a lot of traffic and then it was washed gently with a sponge moistened with detergent. The extent of staining of specimens was observed visually before and after exposure.
○: No difference before and after exposure
Δ: Attachment of foreign material and permeation into the paint film
X: Attachment of foreign material and marked permeation into the paint film
*7 Water Repelling Properties
The specimen was exposed for 3 months on the roof of a building facing the Capital Freeway where there was a lot of traffic and then it was washed lightly with a sponge which had been moistened with detergent and then it was rinsed with water. Finally, it was rinsed with distilled water and the water was wiped off with a clean cloth and, after being left to stand for 24 hours, the angle of contact of water on the specimen surface was measured using an angle of contact measuring device [Elma Goniometer type Angle of Contact Measuring Device model G-1 for use at normal temperature, manufactured by the Elma Co.). The water repelling properties were assessed on the basis of the measured value.
○: Angle of contact with water more than 80°
Δ: Angle of contact with water 70–80°
X: Angle of contact with water less than 70°
*8 Gasoline Resistance
The specimen was immersed in regular gasoline at 20° C. for 7 hours and then any swelling, discoloration or peeling of the paint film was observed visually.
○: No abnormality
X: At least one of swelling, discoloration and peeling had occurred.
*9 Weather Resistance
The specimen was exposed for 1500 hours to a Sunshine Carbon Arc Lamp (JIS K-5400 (1990), 9.8.1) and then the gloss, discoloration and marking of the paint film were observed visually.
○: The paint film surface was virtually unchanged
X: Water marking and discoloration of the paint film surface had occurred and the reduction in gloss was pronounced.

It is clear from the results of the illustrative example that a clear coat paint comprising a thermoset paint composition of this invention can provide both acid resistance and abrasion resistance, and that paint films which exhibit excellent retention of water repelling properties and staining resistance, and which have excellent gasoline resistance, weather resistance, adhesion on recoating and appearance can be obtained.

On the other hand, in Comparative Example 1 the solubility parameters and hydroxy group values of the (a) and (b) components exceeded 10.5 and 150 mgKOH/g and so the polarity was high in each case, the solubility in organic solvents was reduced and the appearance of the paint film was poor. Furthermore, since the solubility parameter of the (a) component exceeded 10.5, the water repelling properties and the staining resistance were reduced. The abrasion resistance, gasoline resistance and weather resistance were difficult to assess because of the poor appearance of the paint film. Furthermore, no (d) component was included in Comparative Example 1 and so the acid resistance was poor.

Comparative Example 2 did not contain a (b) component which had a flexible hydroxy group containing atomic grouping as represented by general formula [1], and so the abrasion resistance and the recoat adhesion properties were poor and, moreover, the acid resistance was poor since it contained no (d) component.

Comparative Example 3 was such that the glass transition temperature of the paint film was less than 50° C. and so the water repelling properties and staining resistance were poor. Furthermore, since it contained no (b) component the abrasion resistance and recoat adhesion properties were poor, and the gasoline resistance was poor because it contained no (c) component.

Effect of the Invention

As has been outlined above, the thermoset paint compositions of this invention have specified contents of specified fluorine containing copolymers and specified vinyl based (co) polymers and, moreover, a specified composition of alkyl etherified melamine resin and blocked polyisocyanate compound is used for the hardener, and so it is possible to obtain paint films which have excellent acid resistance, abrasion resistance, adhesion, staining resistance, water repelling properties and appearance.

What is claimed is:

1. A thermoset paint composition, comprising:
  (a) from 20 to 70% by weight of a fluorine containing copolymer comprising the result of copolymerizing
    at least one fluoro-olefin monomer,
    at least 10% by weight of one or more hydroxy group containing vinyl monomer having at least four atoms between a vinyl group and a hydroxy group, and a terminal hydroxy group, the percent by weight based on the total weight of copolymer (a), and
    one or more other vinyl monomer,
    the fluorine containing copolymer (a) having a solubility parameter from 9.0 to 10.5 and a hydroxy group value from 60 to 150 mgKOH/g$_2$
  (b) from 20–70% by weight of a vinyl (co)polymer comprising the result of copolymerizing at least one vinyl monomer, said at least one vinyl monomer comprising at least 10% by weight of one or more monomers represented by the general formula 1

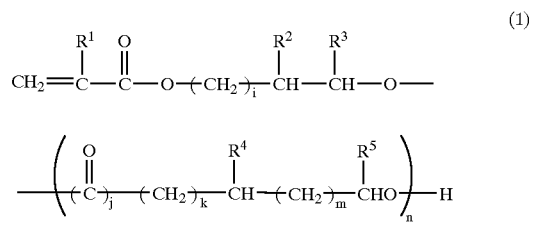

wherein $R^1$ to $R^5$ each independently represent H or methyl group, i is 0–2, j is 0 or 1, k is 0–3, mis 0–3 and n is 0–10,
  the vinyl (co)polymer (b) having a solubility parameter from 9.0 to 10.5 and a hydroxy group value from 60 to 150 mgKOH/g,
  (c) from 5 to 40% by weight of alkyl etherified melamine resin, and
  (d) from 2 to 40% by weight of blocked polyisocyanate compound,
wherein all percents by weight are based on the total weight of the resin components (a) to (d), the thermoset paint composition providing a paint film having a glass transition temperature after hardening of at least 50° C.

2. The thermoset paint composition of claim 1 which is a topcoat.

* * * * *